United States Patent [19]

Lee

[11] Patent Number: 5,896,547
[45] Date of Patent: Apr. 20, 1999

[54] METHOD OF EXECUTING AN INITIALIZATION AND CALIBRATION ROUTINE OF A HARD DISK DRIVE

[75] Inventor: Jung-Ho Lee, Ahnyang, Rep. of Korea

[73] Assignee: SamSung Electronics Co., Ltd., iyungki-do, Rep. of Korea

[21] Appl. No.: 08/907,345

[22] Filed: Aug. 6, 1997

[30] Foreign Application Priority Data

Aug. 6, 1996 [KR] Rep. of Korea ............ 96- 32751

[51] Int. Cl.⁶ .................................................. G06F 13/10
[52] U.S. Cl. ............... 395/868; 395/828; 395/183.12; 711/100; 711/170
[58] Field of Search ................ 360/77.01–77.11, 360/78.04–78.12; 711/100, 170; 395/868, 828–830, 894, 183.12, 733

[56] References Cited

U.S. PATENT DOCUMENTS

| 4,814,909 | 3/1989 | Brown et al. ............ 360/78.07 |
| 5,227,930 | 7/1993 | Thanos et al. ............ 360/78.04 |
| 5,280,603 | 1/1994 | Jeppson et al. ............ 360/69 |
| 5,574,920 | 11/1996 | Parry ............ 395/750.08 |
| 5,802,398 | 9/1998 | Liu et al. ............ 395/882 |

*Primary Examiner*—Christopher B. Shin
*Attorney, Agent, or Firm*—Robert E. Bushnell, Esq.

[57] ABSTRACT

An apparatus and method for executing a series of initialization calibration routines of a hard disk drive employing a small computer system interface, which is performed by calling and executing an initialization calibration routine having an address firstly designated among initialization calibration routines plurally divided if there is occurrence of a servo interrupt during execution of a main code, and continually executing the main code after designating next address to be called upon completion of execution of the called initialization calibration routine.

11 Claims, 4 Drawing Sheets

METHOD OF EXECUTING AN INITIALIZATION AND CALIBRATION ROUTINE OF A HARD DISK DRIVE

CLAIM OF PRIORITY

This application makes reference to, incorporates the same herein, and claims all benefits accruing under 35 U.S.C §119 from an application entitled Method Of Executing Initialization Calibration Routine Of Hard Disk Drive earlier filed in the Korean Industrial Property Office on Aug. 6, 1996, and there duly assigned Ser. No. 96-32751 by that Office.

BACKGROUND OF THE INVENTION

1. Field of the Invention

The present invention relates to an initialization routine of a hard disk drive, more particularly, to an apparatus and a process for sequentially executing initialization calibration routines divided whenever an interrupt occurs.

2. Description of the Related Art

For the past several decades, the progress of the computer technology has led the advancement of the modem communication industry as well as the rapid progress of software and VLSI technologies. According to this trend, the demand for auxiliary storage media of high speed performance and high capacity has increased, thus resulting in the advent of computer systems employing a small computer system interface (SCSI).

Generally, in a computer system one or more hard disk drives are connected to a SCSI controller. Each of hard disk drives (HDD) connected with the SCSI controller, writes data transmitted from a main controller on disks or reads data recorded on the disks and transmits it to the main controller under the control of the SCSI controller. The SCSI controller connected between the main controller and the HDDs controls the interfacing of input/output signals of the main controller and HDDs. The main controller supervises the overall operations of the host computer, and controls read/write operations of each HDD. Respective HDDs connected with the SCSI controller perform a series of initialization calibration routines whenever electric power is applied. The initialization calibration routines include the steps of driving a spindle motor to rotate the hard disk at full speeds; calibrating bias to all tracks of the disk; and measuring and calibrating a gain of each integrated circuit (such as a digital/analog converter, a voice coil motor driving IC, etc.) on the printed circuit board.

The above-described calibration routines are programmed to be executed in the initialization routine that is carried out every time power is applied to the drive in order to remove the non-linear characteristics that servo-control cannot compensate for. In a conventional hard disk drive employing a SCSI mechanism, there is problem in that it is impossible to respond a command input from an external system during execution of the calibration routines.

Particularly, in the conventional hard disk drive employing the SCSI mechanism, the initialization routine is executed upon applying electric power. A main code comprises an initialization routine embodying a series of calibration codes to be executed according to a code performance sequence. If an interrupt is attempted in response to a servo sector during the execution of the calibration code, the execution of the initialization routine of the main code (i.e. calibration code) can not be interrupted As a result, in the conventional hard disk drive employing the SCSI mechanism, there is problem in that it is impossible to respond to a command input from an external system when the calibration code is executed as one of the main code.

A method for initializing a drive and for periodically updating its calibration of an encoder and a head position servo is contemplated by U.S. Pat. No. 5,227,930 to William N. Thanos, et al., entitled Head Position Recalibration For Disk Drive; and a servo calibration method carried out during initialization is contemplated by U.S. Pat. No. 4,814, 909 to David A. Brown, et al. entitled Data Transducer Position Control System For Rotating Disk Data Storage Equipment.

SUMMARY OF THE INVENTION

It is an object of the present invention to provide an improved process and apparatus for executing calibration routines.

It is another object to provide a method of executing initialization calibration routines as well as a main code for initializing drives or a given command input from an external system, in a hard disk drive employing the SCSI mechanism.

In order to realize the above objects, the present invention provides an apparatus and process for executing initialization calibration routines of a hard disk drive employing a small computer system interface, which is performed by calling and executing an initialization calibration routine having an address firstly designated among the initialization calibration routines plurally divided if there is occurrence of a servo interrupt during execution of a main code, and continually executing the main code after designating next address to be called upon completion of execution of the called initialization calibration routine.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
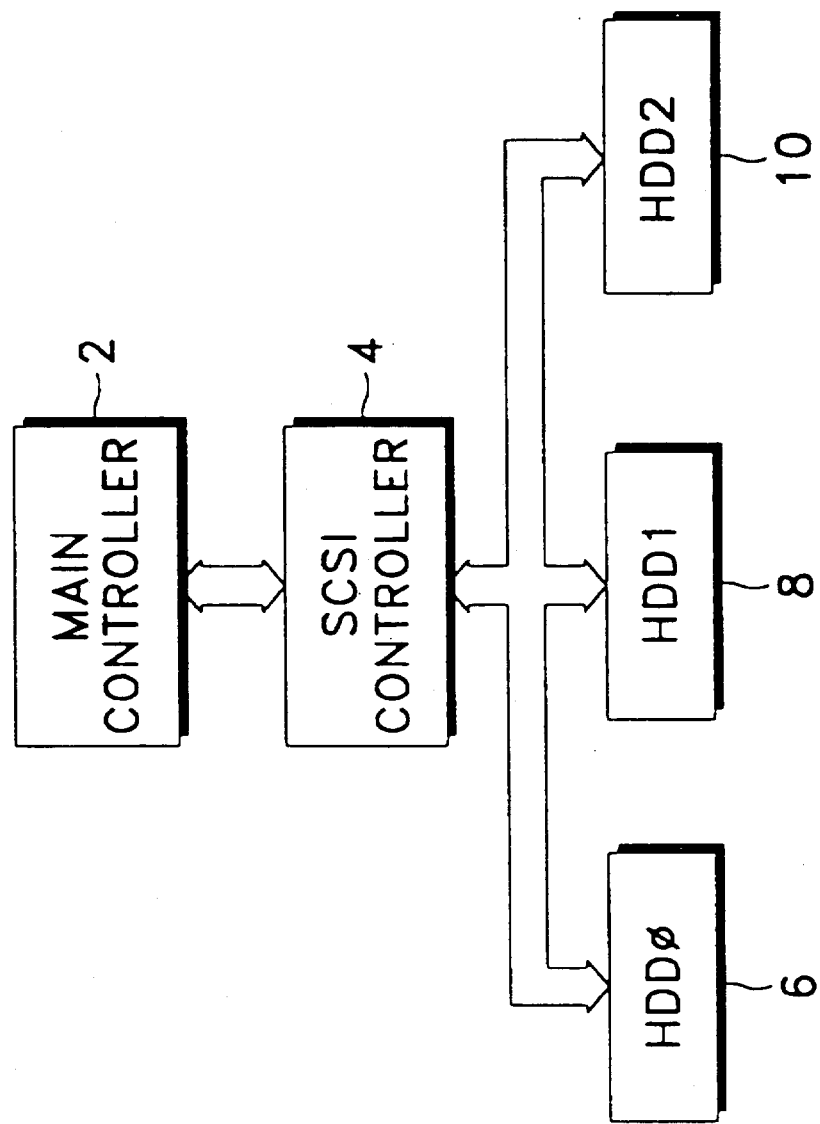
FIG. 1 is a block diagram of a computer system in which an SCSI controller is connected with a plurality of hard disk drives.

Referring to FIG. 1, the initialization routine of a hard disk drive employing a SCSI mechanism, is now described in detail.

FIG. 1 is a block diagram of a computer system in which a plurality of hard disk drives are connected to an SCSI controller 4. As shown in FIG. 1, each of hard disk drives (HDD) 6, 8 and 10, connected with SCSI controller 4, writes data transmitted from a main controller 2 on disks or reads data recorded on the disks and transmits it to main controller 2 under the control of SCSI controller 4. SCSI controller 4, connected between main controller 2 and HDDs 6, 8 and 10, controls the interfacing of input/output signals of main controller 2 and HDDs 6, 8 and 10. Main controller 2 supervises the overall operations of the host computer, and controls read/write operations of each HDD 6, 8 and 10. Respective HDDs 6, 8 and 10 connected with SCSI controller 4, perform a series of initialization calibration routines whenever electric power is applied.

The initialization calibration routines include the steps of driving a spindle motor to rotate the hard disk at full speeds; calibrating bias to all tracks of the disk; and measuring and calibrating a gain of each integrated circuits such as a digital/analog converter, a voice coil motor driving IC, etc., on the printed circuit board.

Figure 2:
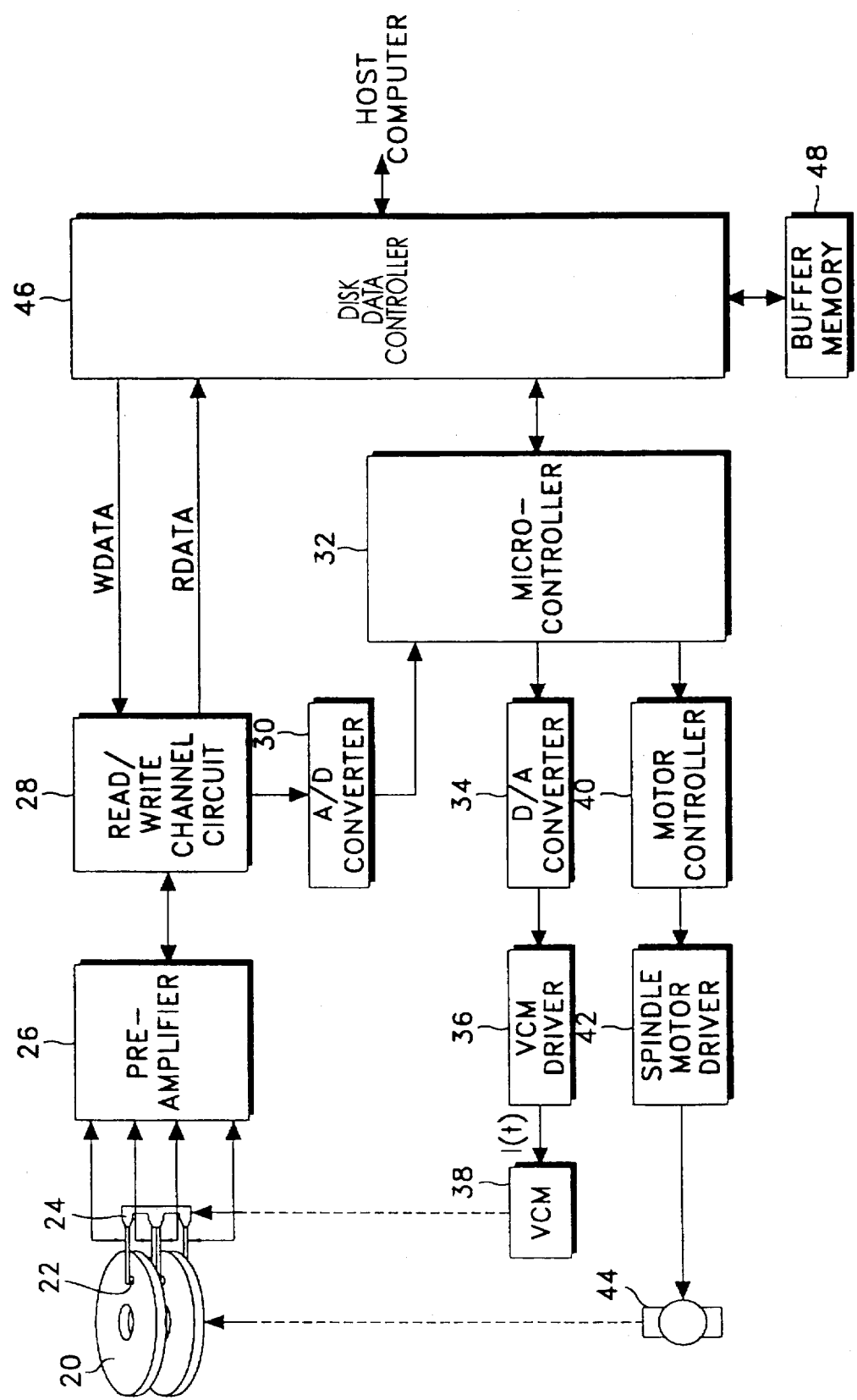
FIG. 2 is a block diagram of each hard disk drive of FIG. 1.

FIG. 2 is a block diagram of a hard disk drive (HDD) 6 among the plurality of HDDs 6, 8 and 10, each connected to SCSI controller 4, wherein HDD 6 includes two disks 20 and four heads 22 corresponding to them.

Referring to FIG. 2, stacked disks 20 rotate while being mounted on an operating shaft of a spindle motor 44, and each side of disks 20 has a head 22. Heads 22 are positioned on the surface of each of disks 20 and installed on an arm 24 vertically extended to an arm assembly of a rotary voice coil motor (VCM) 38. A pre-amplifier 26 pre-amplifies a read signal picked up by one of heads 22 during reading of data, and applies it to a read/write channel circuit 28. During writing of data, pre-amplifier 26 drives one of heads 22 so as to write encoded write data input from read/write channel circuit 28 on a corresponding disk 20. At this time, pre-amplifier 26 selects one of heads 22 under the control of a disk data controller (DDC) 46. Read/write channel circuit 28 decodes the read signal input from pre-amplifier 26, thereby producing read data RDATA, and encodes write data WDATA to send it to pre-amplifier 26. Read/write channel circuit 28 also demodulates head position information that is a part of the servo information written on disks 20, thereby producing a position error signal (PES) which is provided to an analog/digital (A/D) converter 30. A/D converter 30 converts the signal PES into a digital value corresponding to its level, thereby supplying the digital value to a microcontroller 32.

DDC 46 writes data input from the host computer on disks 20 through read/write channel circuit 28 and pre-amplifier 26, or transmits data read from disks 20 to the host computer. DDC 46 interfaces the communication between the host computer and microcontroller 32. Microcontroller 32 controls DDC 46 in response to a command for read/write data, and supervises track searching and tracking. At this time, microcontroller 32 controls tracking by using a PES value input from A/D converter 30, and performs servo control in response to various servo control signals output from a gate array (not shown). A D/A converter 34 converts a control value for controlling the position of each head 22, generated from microcontroller 32, into an analog signal, thereby outputting it to a voice coil motor (VCM) driver 36. VCM driver 36 generates, to VCM 38, a current I(t) for operating an actuator in response to the signal input from D/A converter 34. VCM 38, positioned on the other side of the actuator to which heads 22 are attached, moves heads 22 horizontally over disks 20 in response to a current direction and a current level input from VCM driver 36.

A motor controller 40 controls a spindle motor driver 42 according to a control value, for controlling the rotation of disks 20, generated from the microcontroller 32, and spindle motor driver 42 operates spindle motor 44 to rotate disks 20 under the control of motor controller 40. A buffer memory 48 connected to DDC 46, temporarily stores data transmitted between each disk and the host computer under the control of DDC 46.

Figure 3:
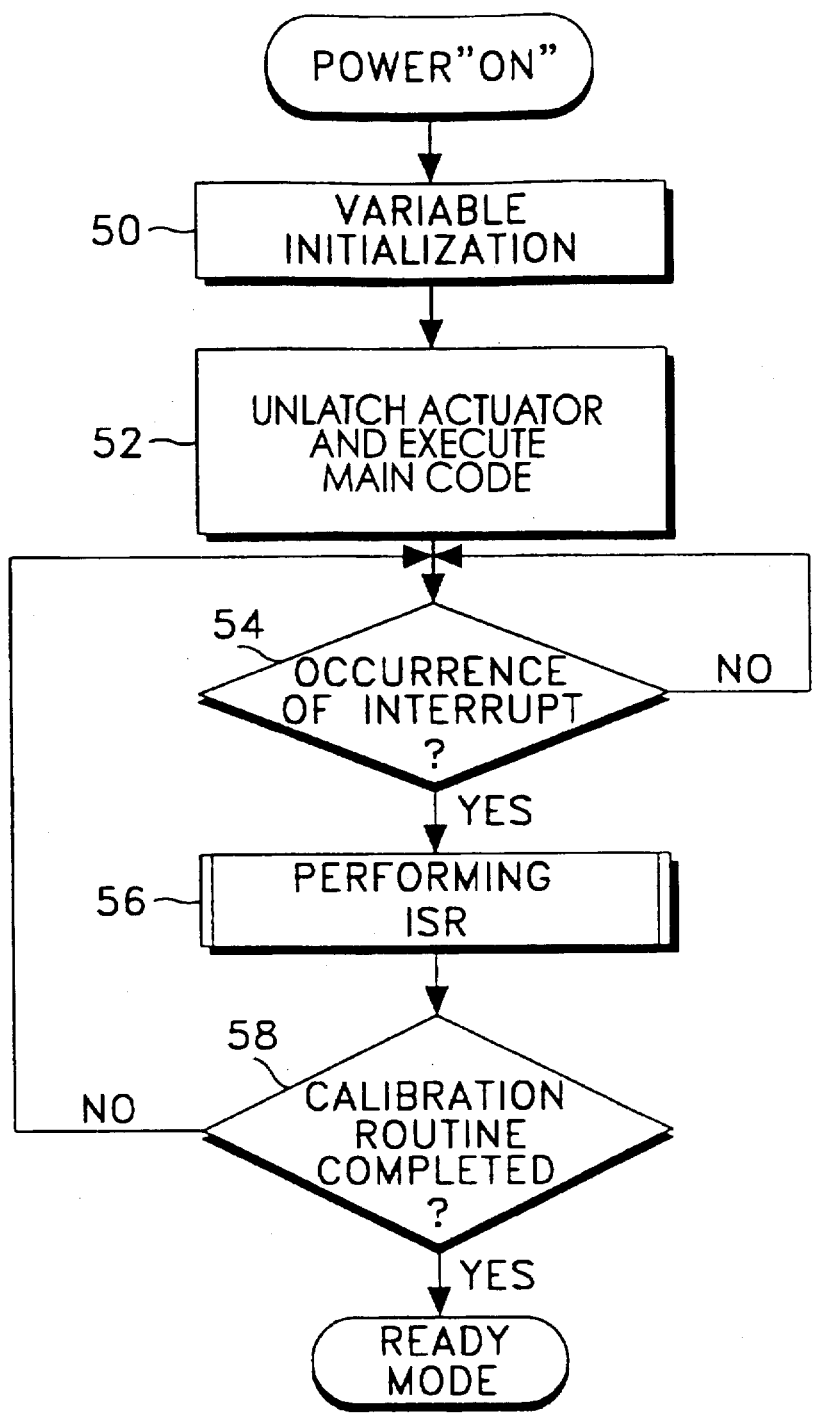
FIG. 3 is a flow chart of the control sequence of the initialization routine in accordance with an preferred embodiment of the present invention.
Figure 4:
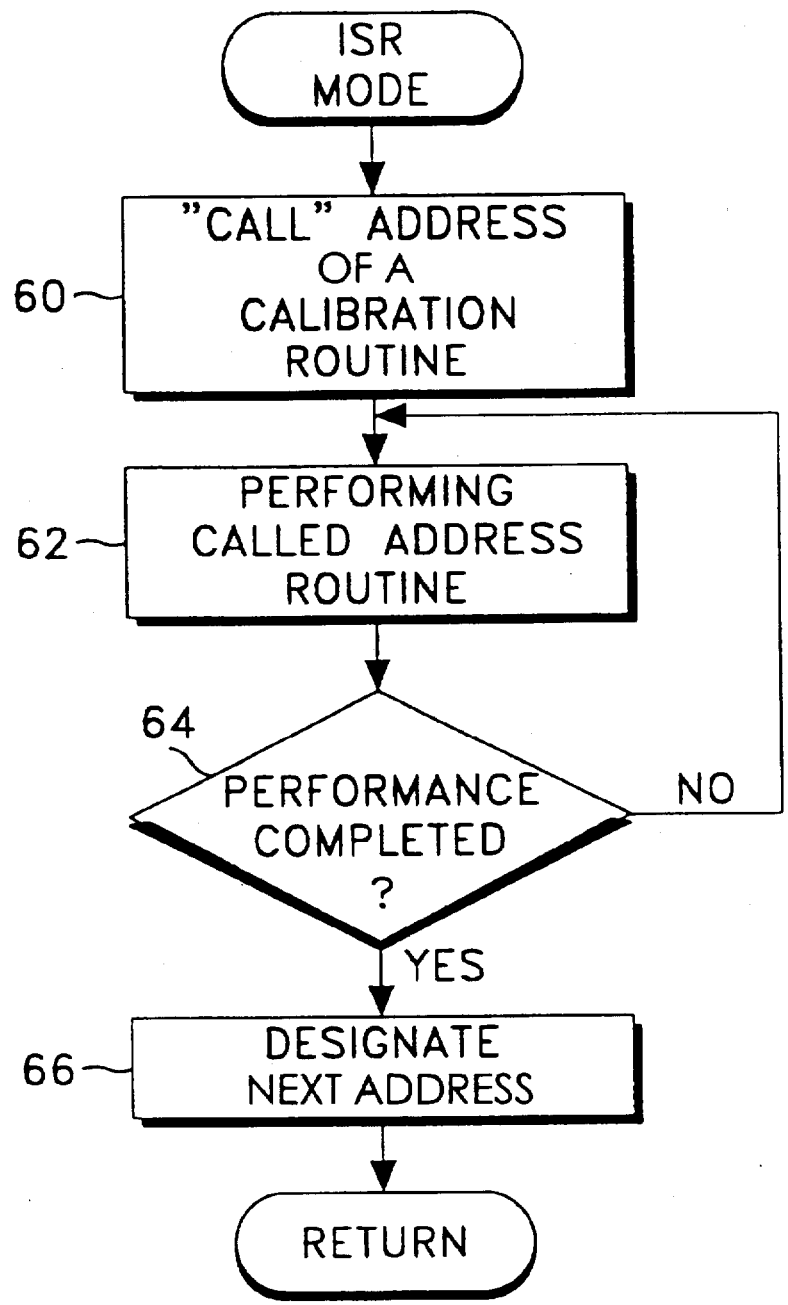
FIG. 4 is a flowchart of the control sequence of the interrupt service routine of FIG. 3.

In the embodiment of the present invention, a series of calibration routines executed in a drive initialization routine are divided into one of plural calibration routines and are executed at the middle of the execution of the ISR whenever an interrupt occurs, which is different than a conventional method. Referring to FIGS. 2 to 4, the embodiment will be described in detail.

First, when electric power is applied to a computer system employing the SCSI mechanism, the microcontroller 32 initializes system variables in step 50 and then proceeds to step 52. An example of variables being initialized is a flag bit of each initialization calibration routine (e.g. a bias calibration routine, a gain calibration routine, etc.) is set to "1" and the address of the calibration routine to be executed first among the initialization calibration routines is designated at the same time in order to embody the present invention. The flag bit is reset as "0" after executing each calibration routine, thus preventing each initialization calibration routine from being repeatedly performed. And, the address is a value regulating execution sequence of each initialization calibration routine plurally divided. Microcontroller 32 unlatches the actuator located at the parking zone in step 52 and then sequentially executes the main code according to a code execution sequence. In step 54, it is determined whether or not an interrupt has occured. When an interrupt occurs during execution of the main code, microcontroller 32 proceeds to step 56 and performs the interrupt service routine (ISR) of FIG. 4 corresponding to the interrupt. It should be understood that the main code executed at step 52 includes one or more calibration ISRs.

Referring to FIG. 4, in the ISR performance, microcontroller 32 calls, in step 60, an address of an initialization calibration routine. The first address called will correspond to a first calibration routine designated during the variable initialization process. The first designated calibration routine is a calibration routine having an address designated in the variable initialization process among a divided plurality of calibration routines (e.g. bias calibration routine, gain calibration routine, etc.) to be executed in the initialization routine. Thereafter, microcontroller 32 performs the calibration routine corresponding to called address in step 62, and checks in step 64 whether the calibration routine of the called address has been completely performed. If it is determined that the calibration routine of the called address is completely executed, microcontroller 32 resets the flag bit corresponding to the calibration routine as "0", and proceeds to step 66. In the step 66, microcontroller 32 designates an address corresponding to a calibration routine to be performed next, and returns to step 58 of the initialization routine of FIG. 3 under a waiting state.

Thereafter, microcontroller 32 checks in step 58 whether a series of the initialization calibration routines to be carried out in the initializing routine are all completed. If it is determined that the series of the initialization calibration routines are all completed, the microcontroller 32 completes the above-described initialization routine, and converts into a drive ready mode. On the contrary, if it is determined that the series of the initialization calibration routines are not completed, microcontroller 32 checks again in step 54 whether there is an occurrence of an interrupt, while executing the main code. If the occurrence of an interrupt is again detected in step 54, microcontroller 32 proceeds to the above ISR mode to perform the next designated calibration routine, thus gradually completing a series of the initialization calibration routines in a way of executing the calibration routine having the address next designated in the execution of the ISR. That is, microcontroller 32 executes the main code for initializing the drive before occurrence of the interrupt, and, if there is an occurrence of an interrupt during execution of the main code, proceeds to the ISR mode, thereby completing the execution of the calibration routine having the address designated in the ISR mode among the initialization divided plurality of calibration routines. And, then microcontroller 32 returns to the main routine, thereby continually performing the main routine. Accordingly, the hard disk drive according to the present invention can perform a control operation corresponding to a command input from an external system while executing a series of the initialization calibration routines at the same time.

The present invention as mentioned above, has advantage in which each of a series of the initialization calibration routines plurally divided in interrupt service routines is gradually performed, and thus the main code is available to respond to a command input from the external system at the same time.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A hard disk drive employing a small computer system interface, said hard disk drive comprising:

a plurality if stacked disks rotatably mounted on an operating shaft of a spindle motor;

a corresponding pair of heads for each of stacked disks, wherein each side of each disk has a corresponding head for reading and writing from/to said corresponding disk;

an actuator, vertically extended from a rotary voice coil motor, for supporting said heads;

a pre-amplifier for pre-amplifying a read signal picked up by one of said heads during reading of data from said disks, said pre-amplifier supplying said read signal to a read/write channel circuit;

said pre-amplifier driving one of said heads to write encoded write data input from said read/write channel circuit on a corresponding one of said disks during a writing operation, wherein said pre-amplifier selects one of said heads in response to a disk data controller, wherein said disk data controller writes data input from a host computer on said disks through said read/write channel circuit and said pre-amplifier, or transmits data read from said disks to said host computer;

said read/write channel circuit for decoding the read signal supplied from said preamplifier to produce read data, and for encoding write data to send to said pre-amplifier, wherein said read/write channel circuit demodulates head position information that is a part of servo information written on said disks for producing a position error signal which is provided to an analog-to-digital converter;

said analog-to-digital converter for converting said position error signal into a digital value corresponding to a level of said position error signal and for supplying said digital value to a microcontroller, wherein said disk data controller interfaces the communication between said host computer and said microcontroller;

said microcontroller for controlling said disk data controller in response to a command for read/write data, for supervising track searching and tracking, wherein said microcontroller controls said tracking in response to said digital value output by said analog-to-digital converter;

a digital-to-analog converter for converting a control value generated by said microcomputer for controlling the position of each head into an analog signal, said analog signal being supplied to a voice coil motor driver;

said voice coil motor for generating a current for controlling said voice coil motor in response to said analog signal from said digital-to-analog converter;

a motor controller for controlling a spindle motor driver for controlling the rotation of said disks in response to a control value generated from said microcontroller;

a buffer memory connected to said disk data controller for temporarily storing data transmitted between each disk and said host computer;

said microcontroller for initializing system variables upon power-up of said hard disk drive and executing a main code corresponding to an intitialization process until an interrupt occurs in said main code;

said microcontroller for performing a first initialization calibration routine when said interrupt occurs;

said microcontroller for designating a next initialization calibration routine to be performed when said first initialization calibration routine is completed;

said microcontroller for determining whether said series of initialization calibration routines has been completed;

said microcontroller for determining whether another interrupt occurs in said main code when it is determined that said series of initialization calibration routines has not been completed, and performing said next calibration routine upon detection of said another interrupt;

said microcontroller for setting said hard disk drive in a drive ready mode when it is determined that said series of initialization calibration routines has been completed.

2. The hard disk drive as set forth in claim 1, wherein said microcontroller designates a first address corresponding to said first initialization calibration routine to be performed while initializing said system variables.

3. The hard disk drive as set forth in claim 1, wherein said microcontroller sets a flag bit to a predetermined value when a corresponding initialization calibration routine is completed to prevent said corresponding initialization calibration routine from being repeated.

4. The hard disk drive as set forth in claim 1, wherein each of said initialization calibration routines, of said series of the initialization calibration routines, is designated by a corresponding address.

5. A method of executing a series of initialization calibration routines of a hard disk drive employing a small computer system interface, said method comprising:

initializing system variables upon power-up of said hard disk drive;

unlatching an actuator of said hard disk drive;

executing a main code corresponding to an intitialization process;

determining whether an interrupt occurs in said main code, and repeating said determining step until it is determined that said interrupt has occured;

performing a first initialization calibration routine when it is determined that said interrupt has occured;

designating a next initialization calibration routine to be performed when said first initialization calibration routine is completed;

determining whether said series of initialization calibration routines has been completed;

performing said step of determining whether an interrupt occurs in said main code when it is determined that said series of initialization calibration routines has not been completed, and performing said next calibration routine upon detection of another interrupt;

setting said hard disk drive in a drive ready mode when it is determined that said series of initialization calibration routines has been completed.

6. The method as set forth in claim 5, wherein said step of initializing system variables comprises designating a first address corresponding to said first initialization calibration routine to be performed.

7. The method as set forth in claim 5, further comprising a step of setting a flag bit to a predetermined value when a corresponding initialization calibration routine is completed to prevent said corresponding initialization calibration routine from being repeated.

8. The method as set forth in claim 6, wherein said step of performing said first initialization calibration routine when it is determined that said interrupt has occured comprises calling said first address designated during said step of initializing system variables.

9. The method as set forth in claim 5, wherein each of said initialization calibration routines, of said series of the initialization calibration routines, is designated by a corresponding address.

10. A method of executing a series of initialization calibration routines of a hard disk drive employing a small computer system interface, said method comprising:

designating a first address corresponding to a first initialization calibration routine to be performed upon powering up said hard disk drive;

executing a main code corresponding to an intitialization process;

determining whether an interrupt occurs in said main code, and repeating said determining step until it is determined that said interrupt has occured;

calling said first address and performing a corresponding initialization calibration routine when it is determined that said interrupt has occured;

setting a flag bit to a predetermined value when said corresponding initialization calibration routine is completed to prevent said corresponding initialization calibration routine from being repeated; designating a next address corresponding to a next initialization calibration routine to be performed;

determining whether said series of initialization calibration routines has been completed;

performing said step of determining whether an interrupt occurs in said main code when it is determined that said series of the initialization calibration routines has not been completed, and performing said next address corresponding to a next initialization calibration routine upon detection of another interrupt;

setting said hard disk drive in a drive ready mode when it is determined that said series of the initialization calibration routines has been completed.

11. The method as set forth in claim 10, wherein each of said initialization calibration routines of said series of the initialization calibration routines is designated by a corresponding address.

* * * * *